US012474161B2

(12) United States Patent
Aykac et al.

(10) Patent No.: US 12,474,161 B2
(45) Date of Patent: Nov. 18, 2025

(54) MEASURING SYSTEM

(71) Applicant: TUSAS-TURK HAVACILIK VE UZAY SANAYII ANONIM SIRKETI, Ankara (TR)

(72) Inventors: Busra Aykac, Ankara (TR); Yahya Oz, Ankara (TR); Remzi Ecmel Ece, Ankara (TR)

(73) Assignee: TUSAS-TURK HAVACILIK VE UZAY SANAYII ANONIM SIRKETI, Ankara (TR)

(*) Notice: Subject to any disclaimer, the term of this patent is extended or adjusted under 35 U.S.C. 154(b) by 430 days.

(21) Appl. No.: 18/015,438

(22) PCT Filed: Apr. 14, 2021

(86) PCT No.: PCT/TR2021/050350
§ 371 (c)(1),
(2) Date: Jan. 10, 2023

(87) PCT Pub. No.: WO2022/015266
PCT Pub. Date: Jan. 20, 2022

(65) Prior Publication Data
US 2023/0273013 A1 Aug. 31, 2023

(30) Foreign Application Priority Data
Jul. 13, 2020 (TR) .................. 2020/11047

(51) Int. Cl.
*G01B 11/06* (2006.01)
*C25D 21/12* (2006.01)
*G01N 27/04* (2006.01)

(52) U.S. Cl.
CPC .......... *G01B 11/0616* (2013.01); *C25D 21/12* (2013.01); *G01N 27/041* (2013.01)

(58) Field of Classification Search
CPC . G01B 11/0616; G01B 11/0683; G01B 11/24; G01B 11/303; C25D 21/12; G01N 27/041; G01R 27/02
See application file for complete search history.

(56) References Cited

U.S. PATENT DOCUMENTS 3,693,075 A * 9/1972 Forster .................. G01B 7/107
324/241
5,963,031 A 10/1999 de Halleux et al.
(Continued)

FOREIGN PATENT DOCUMENTS

DE         2902150 A1    7/1980
DE    102015005724 A1   11/2015
(Continued)

OTHER PUBLICATIONS

GRECO (chapter author), Handbook of Nanoelectrochemistry DOI 10.1007/978-3-319-15207-3_30-2 Springer International Publishing Switzerland 2015 (Year: 2015).*
(Continued)

*Primary Examiner* — Lisa M Caputo
*Assistant Examiner* — Toni D Sauncy
(74) *Attorney, Agent, or Firm* — Notaro, Michalos & Zaccaria P.C.

(57) ABSTRACT

A measuring system is disclosed which includes an electrolysis container, at least one mandrel contained in the electrolysis container and on which a coating is made by surface metallization, a liquid contained in the electrolysis container and containing a solution enabling the conductivity of the mandrel to be increased, more than one probe on the mandrel, enabling the conductivity of the mandrel to be measured, at least one first probe set enabling current to be transmitted onto the mandrel and allowing the current passing on it to be measured by means of an amperemeter (Continued)

Figure 1:
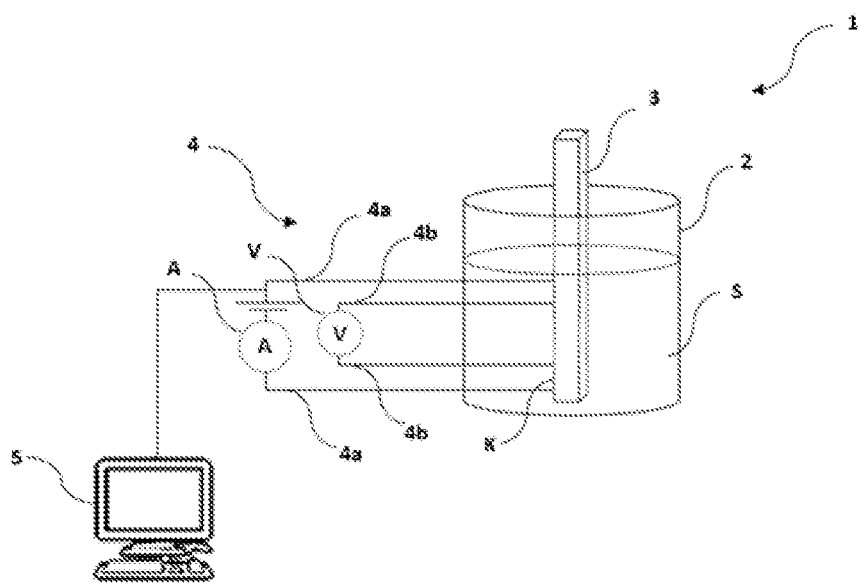

located thereon, at least one second probe set enabling the voltage difference to be measured by a voltmeter.

9 Claims, 2 Drawing Sheets

(56) References Cited

U.S. PATENT DOCUMENTS

| | | | |
|---|---|---|---|
| 6,350,361 B1* | 2/2002 | Sexton | C25D 1/08 216/60 |
| 6,370,406 B1* | 4/2002 | Wach | G02B 6/262 356/301 |
| 6,936,299 B2 | 8/2005 | Bast et al. | |
| 7,078,919 B2 | 7/2006 | Prussin | |
| 2004/0151957 A1* | 8/2004 | Brooks | B01J 19/122 429/408 |
| 2006/0266653 A1* | 11/2006 | Birang | C25D 17/001 205/83 |
| 2010/0276291 A1* | 11/2010 | Durrer | C25D 5/18 204/229.1 |
| 2017/0173577 A1* | 6/2017 | Ausserre | C25D 5/024 |
| 2020/0192328 A1* | 6/2020 | Detor | C25D 21/12 |
| 2020/0208290 A1 | 7/2020 | Kim et al. | |

FOREIGN PATENT DOCUMENTS

| | | | | |
|---|---|---|---|---|
| EP | 0411936 B1 * | 3/1996 | | C25D 1/02 |
| GB | 1520960 A * | 8/1978 | | C25C 3/00 |
| JP | 03211296 A * | 9/1991 | | |
| JP | 2015089955 A * | 5/2015 | | |
| WO | 9701739 A1 | 1/1997 | | |
| WO | WO-2021178978 A1 * | 9/2021 | | B25J 19/0029 |

OTHER PUBLICATIONS

Lu, et al., "A Novel Compensation Algorithm for Thickness Measurement Immune to Lift-Off Variations Using Eddy Current Method", IEEE Transactions on Instrumentation and Measurement, vol. 65, No. 12, Dec. 2016 2773 (Year: 2016).*

Madden, et al., "Three Dimensional Microfabrication by Localized Electrochemical Deposition" JMEMS, vol. 5, No. 1, Mar. 1996 (Year: 1996).*

Moulder, et al.,—"Thickness and conductivity of metallic layers from eddy current measurements", Rev. Sci. Instrum. 63, 3455-3465 (Year: 1992).*

Parkinson, "Electroforming-a unique metal fabrication process" Nickel Development Institute NiDI Technichal Series No. 10084, Oct. 1985 (Year: 1985).*

Ishihara (JP 2015089955A) for Reference Translation for Translation with original document (Year: 2015).*

Naidu, et al., "Simulation and Analysis of Electrolyte Flow Pattern in ECM for L-Shaped Tool Using CFD", IOSR Journal of Mechanical and Civil Engineering, e-ISSN: 2278-1684,p-ISSN: 2320-334X, V14, 1 Ver. V, pp. 70-74 www.iosrjournals.org (Year: 2017).*

Oloomi, et al., "Effects of thin film thickness on emittance, reflectance and transmittance of nano scale multilayers", International Journal of the Physical Sciences vol. 5(5), pp. 465-469, online: http://www.academicjournals.org/IJPS. (Year: 2010).*

Lu, et al., "Studying Electrical Conductivity Using a 3D Printed Four-Point Probe Station", J. Chem. Educ. 2017, 94, 950-955, DOI: 10.1021/acs.jchemed.7b00119 (Year: 2017).*

Dumas, et al. ,"Curved infrared detectors: application to spectrometry and astronomy", Proceedings vol. 7742, High Energy, Optical, and Infrared Detectors for Astronomy IV; 77421V (2010), SPIE Astronomical Telescopes + Instrumentation (Year: 2010).*

International Search Report and Written Opinion for PCT application No. PCT/TR2021/050350, mailed Feb. 27, 2022.

International Preliminary Report on Patentability, completed Sep. 8, 2022.

Demand/Request for Preliminary Examination dated May 11, 2022.

International Application Status Report generated Dec. 26, 2022.

* cited by examiner

MEASURING SYSTEM

This invention relates to a measuring system used in surface metallization processes.

Electrochemical coatings can be applied in the form of electroplating or electroless plating. While electroless coatings is formed by obtaining atoms by an autocatalytic chemical reduction method without using electrical current, electroplating is formed by electrolysis. Electrolysis is the process of the dissociation of dissolved chemical compounds in a liquid by means of an electric current. The electrolysis process is carried out in a container called an electrolysis container or electrolysis tank. Two electrodes which are not in contact with each other are immersed into the container containing a compound (electrolyte) that is dissolved and dissociated into positive and negative charged ions. The potential difference (electric field) that generates when the electrodes are connected to a current source moves the ions toward the oppositely charged electrode (pole). While positively (+) charged ions migrate to the cathode, negatively (−) charged ions flow towards the anode. The atoms oxidized on the anode surface proceed in the solution in an ionized form and are reduced on the cathode surface; thanks to this, a surface metallization (or electrolysis coating) process takes place. Electrolysis coating is widely used with the advantages of creating a good resistance against abrasion and corrosion on the surface, gaining conductivity, etc.

A process of providing electrical conductivity is conducted in various chemical solutions on the substrate, which is non-conductive and/or has a conductivity that is below a desired value. The thickness of coatings formed by atoms attached onto the surface vary according to coating parameters (temperature, duration, current density, current source, pH, mixing, etc.), bath chemicals and composition. Therefore, the ability to measure the variation in the electrical conductivity on the surface of the substrate during the coating process is important for a better interpretation of the mechanism of the study and for measuring the conductivity gained in each step. In addition, measuring the coating thickness and the topographic profile formed by the atoms attached to the surface at each stage and at different temperatures while the process is in progress plays an important role in determining the parameters to be applied in another step.

The United States patent document U.S. Pat. No. 7,078,919B2, which is included in the known state of the art, discloses a method for determining the resistance profile in a P-N structure or in the silicone surface layer on a SOI. Said method comprises applying anodic current in the test site for oxidizing an isolated layer and measuring the resistance of the isolated layer by a four-point probe or by Van der Pauw. The sheet resistance in the test area is measured in-situ.

The German patent document DE2902150A1, which is included in the known state of the art, discloses a device for measuring the surface conductivity of a conductive sheet on an insulating material. Said device has two measuring wheels that apply pressure to the sheet, wherein said wheels are connected to the poles of a measurement current source. The wheels are mounted so as to rotate around an axis perpendicular to the axis of the sheet.

Thanks to a measuring system developed by the present invention, a coating characterization measurement can be performed at each step of a surface metallization process carried out in solution. During coating, it is enabled to measure the variation in the electrical conductivity on the surface of the substrate, to determine the surface thickness profile and to monitor the topographic profile formed by the atoms, which are attached to the substrate, on the surface at each step of the coating process. Thus, the coating efficiency and accuracy of process parameters can be observed. Accordingly, the coating process can be optimized by changing the process parameters in-situ without waiting for the process to end.

The measuring system realized to achieve the object of the invention, as defined in the first claim and in the claims dependent thereon, comprises an electrolysis container, at least one mandrel contained in the electrolysis container and a coating is performed thereon by surface metallization, a liquid contained in the electrolysis container and containing a solution enabling the conductivity of the mandrel to be increased, more than one probe on the mandrel, enabling the conductivity of the mandrel to be measured, at least one first probe set enabling current to be transmitted onto the mandrel and allowing the current passing on it to be measured by means of an amperemeter provided thereon, at least one second probe set enabling the voltage difference to be measured by a voltmeter.

The measuring system of the invention comprises a computer that enables the conductivity value of the coating to be calculated in real time by using the changing current and voltage measurement values during the surface metallization process and at least one arm that allows the probes to approach to or move away from the mandrel in almost the same amount with coating thickness that increases or decreases on the mandrel.

In an embodiment of the invention, the measuring system comprises a probe almost completely coated with an insulating material that prevents contact with the liquid.

In an embodiment of the invention, the measuring system comprises at least one chamber, which is connected to an electrical power supply, to which the arm, which is enabled by the computer to automatically approach to or move away from the mandrel, is connected, and in which the voltmeter is located.

In an embodiment of the invention, the measuring system comprises a computer that gives a warning message that the surface metallization process must be stopped when the mandrel reaches the user-determined conductivity.

In an embodiment of the invention, the measuring system comprises a mandrel whose non-conductivity or conductivity is below the user-desired value prior to the surface metallization process.

In an embodiment of the invention, the measuring system comprises at least one light source that allows light with a long wavelength to be transmitted onto the coating during surface metallization and at least one detector that captures the reflected light from the coating, and a computer that enables a thickness determination to be made with the data received from the detector.

In an embodiment of the invention, the measuring system comprises a detector that is capable to collect on itself all the rays reflected from the coating thanks to its curved form.

In an embodiment of the invention, the measuring system comprises at least one camera that captures and scans the light reflected from the coating, and a computer that enables the surface topography of the coating to be measured with the data received from the camera.

In an embodiment of the invention, the measuring system comprises a computer that simultaneously analyzes the conductivity measurement with the measurement data received from the probes and the thickness measurement with the measurement data received from the detector, and thus enables also the thickness value to be determined, when the user-determined conductivity value is reached.

In an embodiment of the invention, the measuring system comprises a computer that enables Van der Pauw and/or four-point measurements to be made in a liquid containing different ions and at temperatures different from room temperature.

The measuring system realized to achieve the object of the present invention is shown in the attached figures, wherein from these figures;

FIG. 1—is a schematic view of a measuring system that makes a conductivity measurement.

Figure 2:
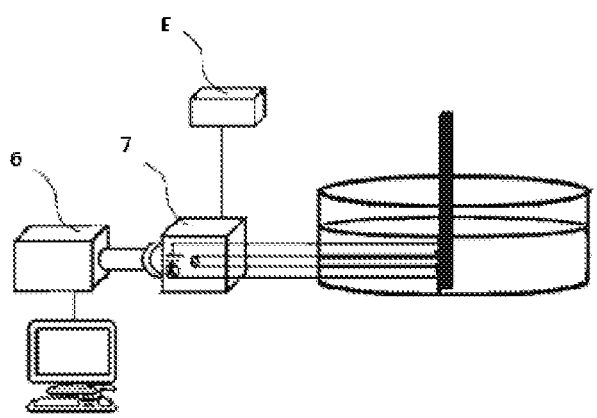

FIG. 2—is a schematic view of a measuring system that makes a conductivity measurement.

Figure 3:
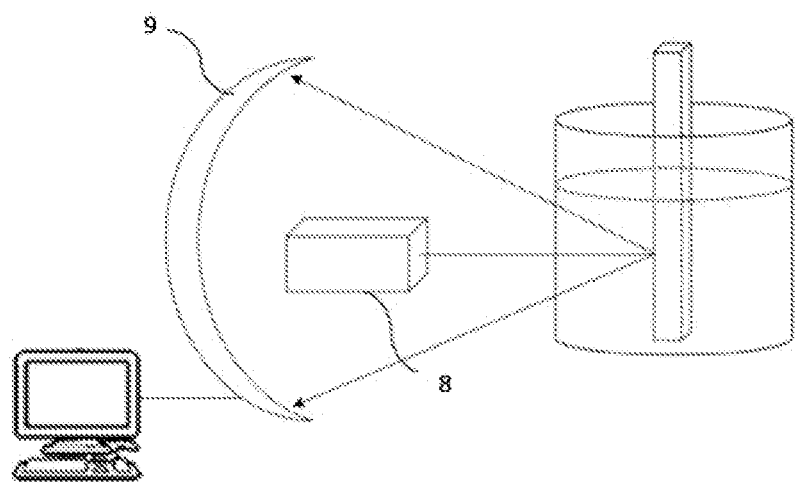

FIG. 3—is a schematic view of a measuring system that makes a coating thickness measurement.

Figure 4:
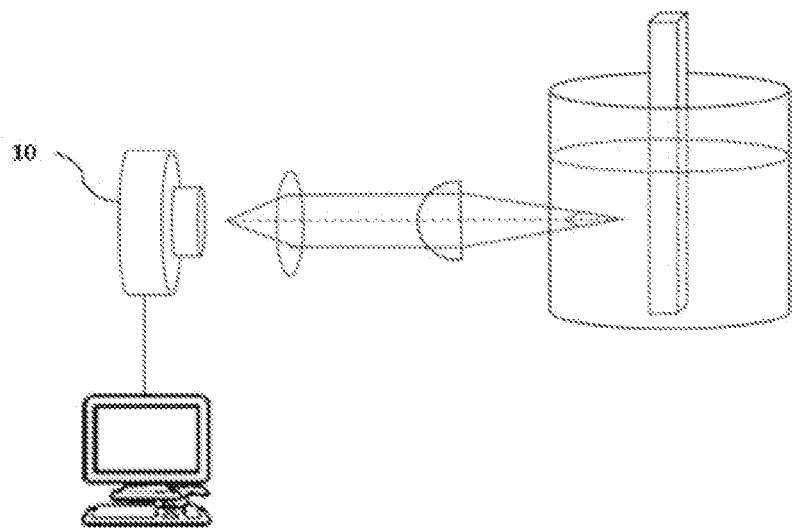

FIG. 4—is a schematic view of a measuring system that makes a coating topography measurement.

All the parts illustrated in figures are individually assigned a reference numeral and the corresponding terms of these numbers are listed below.
1. Measuring system
2. Electrolysis container
3. Mandrel
4. Probe
4a. First probe set
4b. Second probe set
5. Computer
6. Arm
7. Chamber
8. Light source
9. Detector
10. Camera
(S) Liquid
(A) Amperemeter
(V) Voltmeter
(K) Coating
(E) Electric power supply A measuring system (1) comprises an electrolysis container (2), at least one mandrel (3) contained in the electrolysis container (2) and on which a coating (K) is made by surface metallization, a liquid (S) contained in the electrolysis container and containing a solution enabling the conductivity of the mandrel (3) to be increased, more than one probe (4) on the mandrel (3), enabling the conductivity of the mandrel (3) to be measured, at least one first probe set (4a) enabling current to be transmitted onto the mandrel (3) and allowing current passing on it to be measured by means of an amperemeter (A) located thereon, at least one second probe set (4b) enabling the voltage difference to be measured by a voltmeter (V). (FIG. 1)

The measuring system (1) of the invention comprises a computer (5) that enables the conductivity value of the coating (K) to be calculated in real time by using the changing current and voltage measurement values during the surface metallization process and at least one arm (6) that enables the probes (4) to approach to or move away from the mandrel (3) in almost the same amount with the coating (K) thickness that increases or decreases on the mandrel (3). (FIG. 2)

A process of gaining electrical conductivity is carried out by surface metallization on an insulating and/or poorly-conductive mandrel (3). The conductivity measurement of the mandrel (3) is measured using four probes (4). The first probe set (4a) enables current to be transmitted onto the mandrel and the current is measured by the amperemeter (A). The second probe set (4b) is used to measure the voltage and the voltage difference occurring between the second probe set (4b) is measured by a voltmeter (V).

In order to measure the conductivity gained at each step of surface metallization, the probes (4) located on the mandrel (3) must be moved with increasing coating thickness. One arm (6) enables the probes (4) to approach to or move away from the mandrel (3) in almost the same amount with the coating (K) thickness that increases or decreases on the mandrel (3). In this way, the changing current and voltage values during coating (K) are calculated by the computer (5) in real time by using the $\rho=V*A/I*d$ formula for the resistance value and the $\sigma=1/\rho$ formula for the conductivity value. In this formula, $\rho$ (rho) refers to resistivity, A is the surface area of sample, I is the current, d is distance between the probes, and $\sigma$ (sigma) refers to conductivity. The measurement data of the coating (K) can be recorded by the computer and compared with previous applications. With the recorded conductivity and/or thickness values of the coating (K), the performance and quality of the measuring system's (1) operation can be monitored.

In an embodiment of the invention, the measuring system (1) comprises a probe (4) almost completely coated with an insulating material that ensures that it does not come into contact with liquid (S). The outer layer of the probe (4) is coated with an insulating material to prevent the conductivity of the liquid (S) from being measured, and there is no insulating material where it contacts the mandrel (3) to enable only the coating characterization of the mandrel (3) to be measured.

In an embodiment of the invention, the measuring system (1) comprises at least one chamber (7), which is connected to an electrical power supply (E), to which the arm (6), which is enabled by the computer (5) to automatically approach to or move away from the mandrel (3), is connected, and in which the voltmeter (V) is located. Thanks to the chamber (7) to which the arm (6) that moves according to an algorithm in the computer (5) is connected, it is ensured that the probes (4) move with the increasing coating (K) thickness on the mandrel (3).

In an embodiment of the invention, the measuring system (1), the computer (5) gives a warning message that the surface metallization process must be stopped when the conductivity for the mandrel that is determined by the user prior to the electrolysis process is reached.

In an embodiment of the invention, the measuring system (1) comprises a mandrel (3) whose non-conductivity or conductivity is below the user-desired value prior to the surface metallization process. Electrical conductivity is gained by enabling different atoms to attach to the surface of an insulating and/or poorly-conductive mandrel (3) in more than one step.

In an embodiment of the invention, the measuring system (1) comprises at least one light source (8) that enables light with a long wavelength to be transmitted onto the coating (K) during surface metallization and at least one detector (9) that captures the reflected light from the coating (K), and a computer (5) that allows a thickness determination to be made with the data received from the detector (9). During the surface metallization process and at each stage and under different temperatures, the coating (K) thickness is measured in-situ while the mandrel (3) is in liquid (S). After the first thickness of the mandrel (3) is calibrated, light with a long wavelength is sent and a detector (9) is used that enables to capture all the reflected light from the mandrel (3). With the data obtained from the detector (9), an increase in the thickness can be observed thanks to the algorithm in the computer (5). Thanks to the fact that the changing coating (K) thickness profile can be observed during the process of surface metallization, the coating efficiency and the accuracy of process parameters can be observed and optimized without waiting for the process to end. (FIG. 3)

In an embodiment of the invention, the measuring system (1) comprises a detector (9) with a curved structure. Thanks to the curved structure of the detector (9) that captures the light with a long wavelength, the surface area is increased and the measurement accuracy is increased.

In an embodiment of the invention, the measuring system (1) comprises at least one camera (10) that captures and scans the light reflected from the coating (K), and a computer (5) that enables the surface topography of the coating (K) to be measured with the data received from the camera (10). By enabling the roughness of the coating (K) to be checked and the surface map to be obtained, the roughness values desired by the user are checked instantly at different temperatures during the surface metallization process. In addition, by scanning this measurement without contacting the surface of the mandrel (3) in liquid media and by realizing it during the coating process, it is enabled that the coating efficiency and process parameters are observed effectively. (FIG. 4)

In an embodiment of the invention, the measuring system (1) comprises a computer (5) that simultaneously analyzes the conductivity measurement with the data received from the probes (4) and the thickness measurement with the data received from the detector (9), and thus enables the thickness value to be determined when the user-determined conductivity value is reached. When the desired conductivity value is reached, the thickness measurement is simultaneously stopped and the thickness value at that time is used as the coating thickness.

In an embodiment of the invention, the measuring system (1) comprises a computer (5) that enables Van der Pauw and/or four-point measurements to be made in a liquid (S) containing different ions and at temperatures different from the room temperature. Surface metallization includes alkaline cleaning, acidic etching, sensitization and activation processes. The bathroom composition and temperature vary during these operations. During the surface metallization process, the temperature of the solution can be adjusted by a hot plate with a magnetic stirrer. A thermometer or thermocouple is used to control and keep the temperature constant. In the measuring system (1) where these processes take place, the resistance of the mandrel (3) in the solution containing more than one liquid (S) and at different temperature values is measured by the computer (5) and flexible operating conditions are provided for the measuring system (1) and thanks to this, the coating characterization can be observed in real time during the process.

The invention claimed is:

1. A measuring system (1) comprising:
   an electrolysis container (2),
   at least one mandrel (3) contained in the electrolysis container (2) and on which a coating (K) is made by surface metallization,
   a liquid(S) contained in the electrolysis container,
   more than one probe (4) on the mandrel (3), enabling the conductivity of the mandrel (3) to be measured and comprising at least one first probe set (4a) enabling current to be transmitted onto the mandrel (3) and allowing the current passing on it to be measured by means of an amperemeter (A) located thereon and at least one second probe set (4b) enabling the voltage difference to be measured by a voltmeter (V),
   a computer (5) configured to record the changing current and voltage measurement values of the coating (K) during the surface metallization process, to compare it with previous applications, and to calculate the conductivity value of the coating (K) in real time using the measurement data, and
   at least one arm (6), controlled by the computer (5), that enables the probes (4) to automatically approach to or move away from the mandrel (3) according to the coating (K) thickness that increases or decreases on the mandrel (3).

2. A measuring system (1) according to claim 1, wherein one of the more than one probe (4) is almost completely coated with an insulating material that prevents it from contacting with the liquid(S).

3. A measuring system (1) according to claim 1, comprising at least one chamber (7) connected to an electrical power supply (E), to which the arm (6) is connected, and in which the voltmeter (V) is located.

4. A measuring system (1) according to claim 1, wherein the computer (5) gives a warning message that the surface metallization process must be stopped when the mandrel (3) reaches the user-determined conductivity.

5. A measuring system (1) according to claim 1, comprising:
   at least one light source (8) that enables light with a long wavelength to be transmitted onto the coating (K) during surface metallization, and
   at least one detector (9) that captures the reflected light from the coating (K), and wherein the computer (5) allows a thickness detection to be made with the data received from the detector (9).

6. A measuring system (1) according to claim 5, wherein the detector (9) has a curved structure.

7. A conductivity measuring system (1) according to claim 5, wherein the computer (5) simultaneously analyzes the conductivity measurement with the data received from the probes (4) and the thickness measurement with the data received from the detector (9), and thus enables a thickness value to be determined when the user-determined conductivity value is reached.

8. A measuring system (1) according to claim 1, comprising at least one camera (10) that scans the light reflected from the coating (K), and wherein the computer (5) allows the surface topography of the coating to be measured with the data received from the camera (10).

9. A measuring system (1) according to claim 1, wherein the computer (5) enables Van der Pauw and/or four-point measurements to be made in the liquid(S) containing different ions and at temperatures different from room temperature.

* * * * *